US 11,988,582 B2

(12) United States Patent
Thompson et al.

(10) Patent No.: US 11,988,582 B2
(45) Date of Patent: May 21, 2024

(54) CRYOGENIC LIQUID COMPOSITE SAMPLING SYSTEMS AND METHODS

(71) Applicant: Mustang Sampling, LLC, Ravenswood, WV (US)

(72) Inventors: Kenneth O. Thompson, Ravenswood, WV (US); Kevin Warner, The Woodlands, TX (US); Timothy L Querrey, Ravenswood, WV (US)

(73) Assignee: Mustang Sampling, LLC, Ravenswood, WV (US)

( * ) Notice: Subject to any disclaimer, the term of this patent is extended or adjusted under 35 U.S.C. 154(b) by 531 days.

(21) Appl. No.: 16/928,133

(22) Filed: Jul. 14, 2020

(65) Prior Publication Data
US 2021/0063285 A1 Mar. 4, 2021

Related U.S. Application Data

(60) Provisional application No. 62/892,361, filed on Aug. 27, 2019.

(51) Int. Cl.
*G01N 1/14* (2006.01)
*G01N 1/10* (2006.01)
(52) U.S. Cl.
CPC .......... *G01N 1/14* (2013.01); *G01N 2001/105* (2013.01)
(58) Field of Classification Search
CPC .......... G01N 1/10; G01N 33/225; G01N 1/02; G01N 1/14; G01N 2001/105
USPC ............................................ 73/863.11, 23.41
See application file for complete search history.

(56) References Cited

U.S. PATENT DOCUMENTS

| 5,501,080 | A | * | 3/1996 | McManus | ................ | G01N 1/42 |
| | | | | | | 62/235.1 |
| 7,484,404 | B2 | | 2/2009 | Thompson et al. |
| 9,057,668 | B2 | | 6/2015 | Thompson et al. |
| 9,097,695 | B2 | | 8/2015 | Kriel et al. |

(Continued)

FOREIGN PATENT DOCUMENTS

| CN | 105339774 A * | 2/2016 | ............. G01N 30/06 |
| EP | 2163878 A1 * | 3/2010 | ............. F25J 3/0486 |

(Continued)

OTHER PUBLICATIONS

Translation of CN 105339774.*

(Continued)

*Primary Examiner* — Daniel S Larkin
*Assistant Examiner* — Nashmiya S Fayyaz
(74) *Attorney, Agent, or Firm* — Cahn & Samuels, LLP

(57) ABSTRACT

A cryogenic liquid sampling system including a chamber having affixed therein a sample pump to pull a cryogenic liquid sample from an external source and an enclosure. The enclosure includes a supply port to receive an input stream of a gas, an input port connected to the chamber via a vacuum line, a sample pump port connected to the chamber via a pump line and configured to feed therethrough gas received at the supply port to the sample pump, a vacuum device connected to the input port and configured to generate a vacuum within the chamber by pulling air from the vacuum line, and processing circuitry to control the vacuum device and the sample pump to perform transfer of a cryogenic liquid sample from the external source to an external device.

15 Claims, 1 Drawing Sheet

(56) References Cited

U.S. PATENT DOCUMENTS

| | | | |
|---|---|---|---|
| 9,395,280 B2 | 7/2016 | Thompson et al. | |
| 9,562,833 B2 | 2/2017 | Thompson et al. | |
| 10,078,035 B2 | 9/2018 | Curtis | |
| RE47,478 E | 2/2019 | Thompson | |
| 10,281,368 B2 | 5/2019 | Thompson et al. | |
| 10,684,259 B2 | 6/2020 | Warner et al. | |
| 2011/0192237 A1* | 8/2011 | Bombulie | G01N 1/10 73/863.11 |
| 2013/0263680 A1* | 10/2013 | Barere | G01N 1/44 73/863.12 |
| 2014/0311213 A1* | 10/2014 | Thompson | G01N 1/18 73/864.34 |

FOREIGN PATENT DOCUMENTS

| | | | | |
|---|---|---|---|---|
| RU | 2644864 C2 * | 2/2018 | | F17C 1/00 |
| WO | WO-9967621 A1 * | 12/1999 | | B01D 5/0036 |
| WO | WO-2021102522 A1 * | 6/2021 | | F17D 3/10 |

OTHER PUBLICATIONS

Mustang Sampling, "Mustang Certiprobe Theaded Sample Extractor," Analytically Accurate Technology, Info@MustangSampling.com, Sep. 2019.

Mustang Sampling, "Mustang Certiprobe Flanged Sample Extractor," Analytically Accurate Technology, Info@MustangSampling.com, Sep. 2019.

Mustang Sampling, "Mustang Intelligent Vaporizer Sampling System," Analytically Accurate Technology, Info@MustangSampling.com, Mar. 2019.

Mustang Sampling, "Mustang Composite Sampling System," Analytically Accurate Technology, Info@MustangSampling.com, Sep. 2019.

Mustang Sampling, "Mustang Liquid Sample Pump," Analytically Accurate Technology, info@MustangSampling.com, Dec. 2017.

* cited by examiner

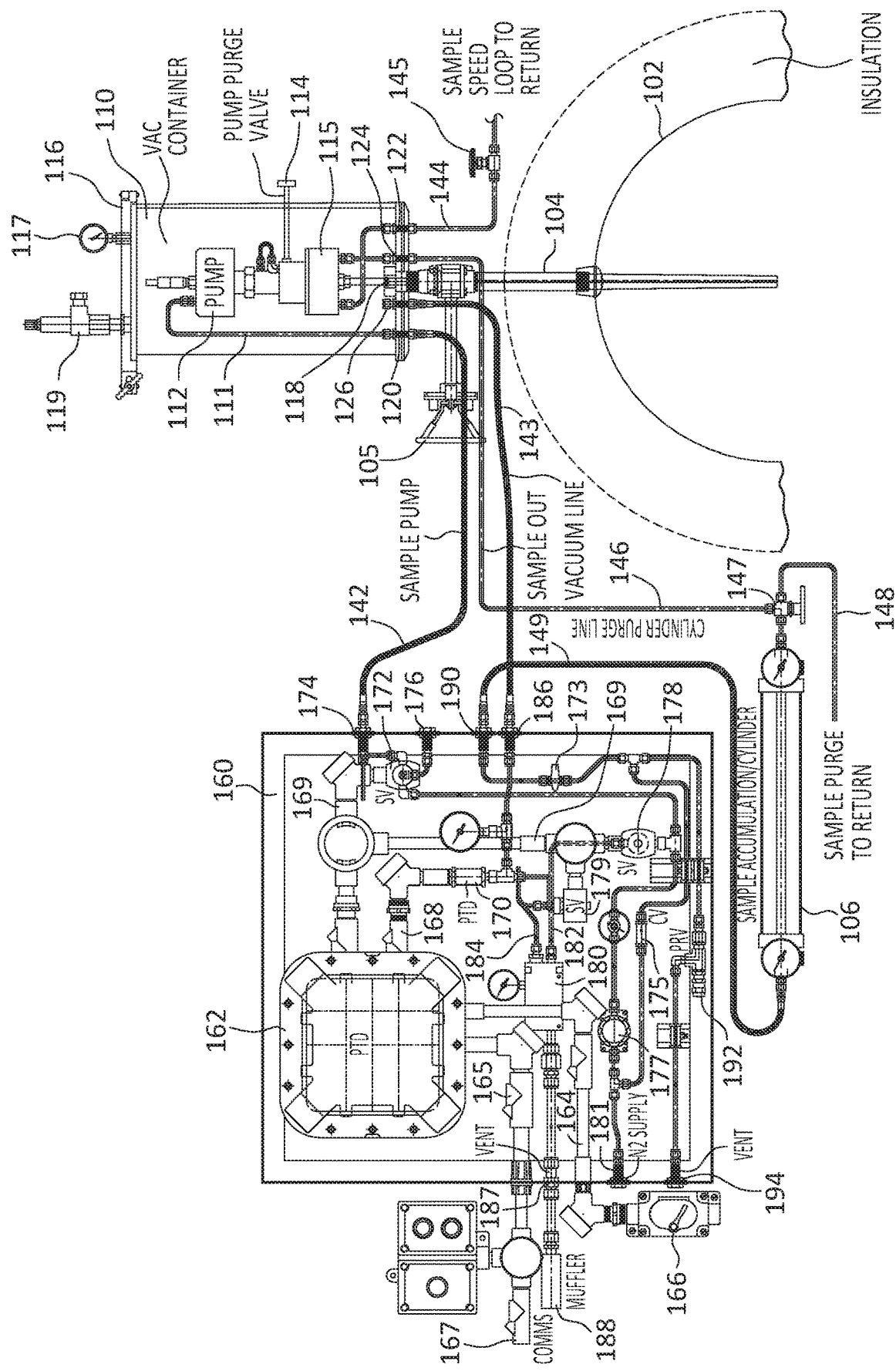

United States Patent US 11,988,582 B2

CRYOGENIC LIQUID COMPOSITE SAMPLING SYSTEMS AND METHODS

FIELD OF THE INVENTION

This invention relates generally to sampling take-off and analysis of cryogenic liquid samples, such as cryogenic ethane, butane or propane, or some combination thereof. More particularly, the invention relates to a system, device and method for sampling a cryogenic liquid from a pipeline and storing the sample in its liquid state in a constant pressure container. The stored liquid can then be analyzed to determine its constituent components.

BACKGROUND OF THE INVENTION

A 2017 U.S. Department of Energy study on annual energy consumption in the United States demonstrates the growing use of natural gas year over year to supply energy. Since 1981, the amount of natural gas used to supply energy in the U.S. has increased year over year. On a worldwide scale, the U.S. Energy Information Administration notes that consumption of natural gas is predicted to increase from 120 trillion cubic feet in 2012 to 203 trillion cubic feet in 2040. Thus, by energy source, natural gas accounts for the largest increase in world primary energy consumption. It remains the key fuel in the electric power and industrial sector.

Natural gas can be moved in its normal gaseous state via geographically spread pipelines or in a cryogenic liquified state (after having gone through a liquefaction process) by specialized carriers such as ships or trucks. Over the last 15 years, liquid natural gas (LNG) trade volumes have grown at double the rate of pipeline volumes and it is expected that the share of LNG will continue to grow in the coming years. One reason for this is that liquefaction of natural gas reduces the gas volume by a factor of 600 thereby making it possible to transport very large energy content over short and long distances in specially-designed tankers and trucks.

Additionally, other liquids in addition to LNG, such as natural gas liquids (NGLs) or liquified petroleum gas (LPGs), used as fuel in heating appliances, cooking equipment and vehicles and increasingly used as an aerosol propellant and a refrigerant have found increased importance over the years. These fuels are also transported in a cryogenic liquid state over short and long distances for custody transfer.

When preparing for the transportation, the cryogenic liquids must go through a custody transfer such as for example from pipeline or a tank to a tanker/truck or vice versa. As part of this process, it is important to determine the energy value of the cryogenic liquid being transferred. To determine the energy value of the cryogenic liquid being transferred, one or more samples of the cryogenic liquid being transferred must be obtained and analyzed.

One option for sampling LNG is to use a sample conditioner which can convert the LNG into a gaseous form, or vapor sample, which can then be analyzed by a gas chromatograph. One exemplary system for LNG sampling is the Mustang® Intelligent Vaporizer Sampling System available from Mustang Sampling, LLC of Ravenswood, West Virginia and disclosed and described at least in U.S. Pat. Nos. 7,484,404 and 7,882,729, the entirety of each which is herein incorporated by reference. An exemplary system for NGL sampling is the Mustang® NGL Sample Conditioning System available from Mustang Sampling, LLC and disclosed and described at least in U.S. Pat. Nos. 9,285,299 and 10,281,368, the entirety of each which is herein incorporated by reference. Alternatively, in certain circumstances, it may be desirable to extract and store the sample directly as a liquid for later analysis by specific analyzing equipment. In such a circumstance, however, the liquid must be sampled so as to maintain an appropriate pressure thereby avoiding any phase change and keeping the sample in a liquid state. Additionally, for some applications, analysis of liquids off-site such as in a lab setting may be preferable. Accordingly, it is necessary to sample and store liquids for transport all while maintaining the sample in its liquid state. One option for storing a sample for later lab analysis while maintaining appropriate pressure is to store the sample in a constant pressure container.

Accordingly, there exists a need for a cryogenic liquid sampling system, device and method for effectively extracting, sampling and storing liquid samples for analysis to accurately determine energy values for custody transfer while also determining the constituent makeup of the cryogenic liquid being transferred.

SUMMARY OF THE INVENTION

It is an object of the present invention to provide a novel cryogenic liquid sampling system, device and method that provide for efficient takeoff and storage of a sample in its liquid state. The liquid can then be analyzed to determine its constituent makeup for various purposes, such as, for example, custody transfer.

It is further an object of the present invention to provide for the takeoff and maintenance of a liquid sample while preventing any phase change of the sample.

It is yet another object of the present invention to provide for the effective capture, storage and portability of the retrieved liquid sample.

It is a further object of the present invention to provide for the capture of samples over a period of time and/or from different sources to provide an accumulated composite in one or more constant pressure containers.

In the following description, reference is made to the accompanying drawing, and which is shown by way of illustration to the specific embodiments in which the invention may be practiced. The following illustrated embodiments are described in sufficient detail to enable those skilled in the art to practice the invention. It is to be understood that other embodiments may be utilized and that structural changes based on presently known structural and/or functional equivalents may be made without departing from the scope of the invention Illustrative, non-limiting embodiments of the present invention may overcome the aforementioned and other disadvantages associated with related art liquid vaporization and measurement systems. Also, the present invention is not necessarily required to overcome the disadvantages described above and an illustrative non-limiting embodiment of the present invention may not overcome any of the problems described above.

To achieve the above and other objects an embodiment in accordance with the invention includes a cryogenic liquid sampling system including a chamber having affixed therein a sample pump configured to pull a cryogenic liquid sample from an external source and an enclosure. The enclosure includes a supply port configured to receive an input stream of a gas, an input port connected to the chamber via a vacuum line, a sample pump port connected to the chamber via a pump line and configured to feed therethrough gas received at the supply port to the sample pump, a vacuum device connected to the input port and configured to generate a vacuum within the chamber by pulling air from the vacuum line, and processing circuitry configured to control the vacuum device and the sample pump to perform transfer of a cryogenic liquid sample from the external source to an external device.

In accordance with another embodiment, the invention includes a cryogenic liquid sampling device including a chamber having affixed therein a sample pump configured to pull a cryogenic liquid sample from an external source and an enclosure. The enclosure includes a supply port configured to receive an input stream of a gas, an input port, a sample pump port configured to feed gas received at the supply port to the sample pump, an input/output port configured to feed gas received at the supply port to an external device, a vacuum device connected to the input port and configured to generate a vacuum within the chamber, and processing circuitry configured to control the vacuum device and the sample pump to perform transfer of a cryogenic liquid sample from the external source to an external device.

In accordance with another embodiment, described herein is a method for sampling a cryogenic liquid including steps for applying gas to a constant pressure container to create a predetermined backpressure within the constant pressure container, creating, via a vacuum device, a vacuum within a chamber by pulling air from the chamber via a vacuum line, extracting, via a sample pump contained within the chamber, a cryogenic liquid sample from an external source and feeding the extracted cryogenic liquid sample through a speed loop, purging a sample line connecting the chamber and the constant pressure container, and directing at least a portion of the cryogenic liquid sample extracted by the pump to the constant pressure container.

BRIEF DESCRIPTION OF THE DRAWINGS

The aspects of the present invention will become more readily apparent by describing in detail illustrative, non-limiting embodiments thereof with reference to the accompanying drawings, in which:

FIG. 1 is a schematic of a liquid sample system according to a first embodiment of the invention which uses a vacuum chamber and vacuum device.

DETAILED DESCRIPTION

Exemplary, non-limiting, embodiments of the present invention are discussed in detail below. While specific configurations and dimensions are discussed to provide a clear understanding, it should be understood that the disclosed dimensions and configurations are provided for illustration purposes only. A person skilled in the relevant art will recognize that, unless otherwise specified, other dimensions and configurations may be used without departing from the spirit and scope of the invention.

As used herein "substantially", "relatively", "generally", "about", and "approximately" are relative modifiers intended to indicate permissible variation from the characteristic so modified. They are not intended to be limited to the absolute value or characteristic which it modifies but rather approaching or approximating such a physical or functional characteristic.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

It will be appreciated that as used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

It will also be appreciated that as used herein, any reference to a range of values is intended to encompass every value within that range, including the endpoints of said ranges, unless expressly stated to the contrary.

As used herein "connected" includes physical, whether direct or indirect, permanently affixed or adjustably mounted. Thus, unless specified, "connected" is intended to embrace any operationally functional connection.

As used herein, "liquid" can include liquid ethane, liquid ethylene, liquid propane, liquid butane, liquid iso-butane, NGL, liquid methane, wet natural gas and LPGs. As used herein, a "cryogenic liquid" includes liquids sufficiently cooled to be in a cryogenic state, such as LNG.

In the following description, reference is made to the accompanying drawings which are provided for illustration purposes as representative of specific exemplary embodiments in which the invention may be practiced. The following illustrated embodiments are described in sufficient detail to enable those skilled in the art to practice the invention. It is to be understood that other embodiments may be utilized and that structural changes based on presently known structural and/or functional equivalents may be made without departing from the scope of the invention.

Given the following detailed description, it should become apparent to the person having ordinary skill in the art that the invention herein provides a novel cryogenic liquid composite sampling system and method thereof for providing augmented efficiencies while mitigating problems of the prior art.

FIG. 1 illustrates a cryogenic liquid sampling system 100 according to an embodiment of the invention. System 100 includes a constant pressure container 106, a cryogenic liquid sampling device comprised of a sealed chamber 110 and enclosure 160, and the corresponding connections therebetween. As an overview of the invention, cryogenic liquid samples are pulled from an external source, such as a pipeline 102, by a pump 112 contained within the chamber 110 and transferred to the constant pressure container 106. As these samples warm throughout the processes described herein, they will lose their cryogenic status but will remain as liquids within the constant pressure container 106. In one example, the pump 112 can be a PGI-Z500 pump manufactured by PGI International Ltd. or a V Dual Seal Plunger available from Williams Milton Roy of Ivyland, PA The cycle timing of pump 112 extraction and a size of the sample extracted by pump 112 are controlled by processing circuitry such as a programmable logic controller (PLC) 162 contained within the enclosure 160. As further described herein, the PLC 162 controls the environment of the chamber 110 and pressure within the constant pressure container 106 to ensure that any cryogenic liquid samples extracted from the pipeline 102 remain in their liquid state from extraction, to transfer and subsequently within the constant pressure container 106.

The chamber 110, which can have an optionally removable lid 116, encloses the pump 112 therein and is positioned approximate a cryogenic liquid source such as pipeline or storage container 102. The chamber 110 includes a sample input port 118 for receiving cryogenic liquid samples pulled from the pipeline 102. Liquid take-off from the pipeline 102 via the sample input port 118 can be achieved for example using a Mustang Certiprobe® Sample Extractor 104 available from Mustang Sampling, LLC of Ravenswood, West Virginia A valve 105 which can be manual or automatically controlled by PLC 162 can be included at the extraction point to allow or prevent extraction by the extractor 104. Thus, when the valve 105 is open, the pump operates to pull cryogenic liquid samples from the pipeline 102 via the extractor 104 at a predetermined sample size and timing controlled by the PLC 162. To control the stroke timing of the pump 112 and size of the sample extraction, the PLC 162 controls the flow of gas, such as nitrogen, from the enclosure 160 to the chamber 110 via a pump line 142 connected to pump input port 120. The nitrogen is passed from the pump input port 120 to the pump 112 via a stroke line 111 contained within the chamber 110.

Once a cryogenic liquid sample is pulled from the pipeline 102, the cryogenic liquid can be transferred through a pump manifold 115 to a speed loop port 122 and back to the pipeline 102 via a speed loop line 144 and/or to a sample output port 124 which leads to the constant pressure container 106 via a sample line 146. In one example, the direction of flow of extracted cryogenic liquid samples can be controlled by optional valves 145 and 147. The speed loop can be first used at the start of an extraction by closing valve 147 and opening valve 145. This initial run of cryogenic liquid through the speed loop line 144 helps to stabilize the temperature and flow of cryogenic liquids prior to sampling. Once the temperature and flow of cryogenic liquid from the pipeline 102 is stabilized (i.e. ice has started to form on speed loop line 144), the valve 145 can be closed either manually or automatically by PLC 162. As for the sample line 146, the valve 147 directs whether the sample is purged and returned to the pipeline 102 via a purge line 148 or passed to the constant pressure container 106. To facilitate a purge, the pump 112 includes a pump purge valve 114 which when operated causes the pump 112 to purge the sample line 146 by pushing any excess cryogenic liquid contained within the sample line 146 out of the system via the purge line 148. The purge valve 114 can positioned proximate to the pump 112 but on an exterior of the chamber 110 for manual operation. In another example, the valve 114 may be integrated within the pump 112 itself and digitally controlled via the PLC 162.

The chamber 110 further includes a pressure gauge 117 for visually monitoring the pressure within the vacuum chamber 110 thereby allowing for the detection of leaks and a pressure relief valve 119 to provide a safety mechanism in the event of over-pressurization of the chamber 110. Additionally, the chamber 110 further includes an optional vacuum port 126 to evacuate air from the chamber 110 via vacuum line 143 to create a vacuum within the chamber 110. A vacuum generated within the chamber 110 provides thermal isolation of the chamber 110 from external ambient temperatures thereby helping to maintain the liquid sample in its liquid form. Accordingly, the vacuum also thermally isolates the pump 112 which is further cooled directly by thermal contact with the cryogenic liquid from the pipeline 102 thereby preventing warming of the pump 112 which could adversely affect the temperature of the liquid sample.

Turning to the enclosure 160, the enclosure can be a cabinet enclosing a plurality of components of the system 100 and preferably conforming in standards to Zone 1, Class 1, Division 1 Group B, C, D, t6 (<85° C.) requirements. The enclosure 160 includes the electrical programmable logic controller (PLC) 162 which receives power and communications data via an electrical conduit 164 and communications conduit 165 from electrical input 166, such as 120 VAC, and communications input 167, respectively. The PLC 162 is connected to a pressure transducer (PTD) 170 via electrical/comm conduit 168 and a plurality of valves (172, 178, 179) via electrical/comm conduit 169 to control overall functionality of the system 100. In one exemplary implementation, the valves (172, 178, 179) may be two and/or three-way solenoid valves.

Valve 172 is connected to a sample pump port 174 which connects the enclosure 160 to pump input port 120 of the chamber 110 via the pump line 142. The valve 172 receives a supply of gas, such as nitrogen, from a supply port 181 via interconnected feed lines which is then fed to the pump 112 through stroke line 111 to control the stroke timing of the pump 112. The supply of the gas is controlled by the PLC 162 via valve 172 to determine timing and an amount of gas which passes to sample pump port 174 as opposed to atmosphere venting port 176. In one example, the pump 112 can be spring-actuated such that the supply of gas via stroke line 111 causes an internal piston to move in a downward direction which causes the pump to take a predetermined sample size from the extraction probe 104. Then, the PLC 162 stops the flow of gas to the pump 112 via valve 172 such that the lack of pressure on the internal spring of the pump 112 causes the piston to move back to a starting position. The PLC 162 can be programmed via communications input 167 based on the specifications of the user as to the timing of the pump 112 and sample size extraction parameters thereby allowing the system 100 to provide sample extraction for a variety of user applications at different intervals and for varying constant pressure container sizes.

Valve 178 can be a two-way solenoid valve which controls the passage of gas, such as nitrogen, from supply port 181 to feed a vacuum device 180. The vacuum device 180 can be an ejector which receives the nitrogen and creates a vacuum via the venturi effect. Thus, the nitrogen received by the vacuum device 180 flows from the input port 182 of the ejector to an interior venturi nozzle (not shown) which increases the flow velocity of the nitrogen therein and in the process creates a vacuum in between the venturi and ejector receiver nozzles which causes air to be drawn in from the vacuum device port 184. As the vacuum device port 184 is connected to the vacuum port 126 via vacuum line 143 and an input port 186, the ejector pulls the air from the chamber 110 thereby creating a vacuum therein. The nitrogen input into the ejector as well as air pulled from the chamber 110 exit the ejector and enclosure 160 via a vent 187 to muffler 188. An example of an ejector that could be used is the model 120L manufactured by Vac-Cubes Further, to ensure that the pressure of gas input into the vacuum device 180 does not exceed product specifications, the pressure of gas received from supply port 181 can be regulated by a pressure reducing regulator 177, such as a GO Regulator manufactured by Circor International, Inc.

To ensure that that vacuum created within the chamber 110 by vacuum device 180 is effectively maintained, the valve 179 is positioned upstream of the input port 186 to prevent the feed of additional air into the vacuum device 180 based on measurements by a pressure transducer (PTD) 170. The pressure transducer 170 is positioned approximate vacuum port 184 and connected to electrical/comm conduit 168 thereby allowing for the transmission of measured pressure signals to the PCL 162. Based on these measurements by the PTD 170, the PLC 162 can control one or more of valves (178, 179) to ensure a proper vacuum within chamber 110. Thus, in one example, when a vacuum is created within the chamber 110 by operation of the vacuum device 180, the PTD 170 will detect a predetermined amount of pressure coming from the vacuum line 173 which, if between predetermined upper and lower bounds, or equal to a predetermined setting, will cause the PLC 162 to close valves 178 and 179. If at some point there is a leak in chamber 110 or other event which causes the vacuum in the chamber 110 to be lost, the PTD 170 will detect this change in pressure and will transmit this information to the PLC 162 which will cause the valves 178 and 179 to open thereby allowing the vacuum device 180 to create a vacuum within the chamber 110 as described previously herein.

In addition to supplying gas to the vacuum device 180 and pump 112, the supply port 181 provides gas, such as nitrogen, to the constant pressure container 106 via interconnected internal feedlines connected to an input/output port 190 and container line 149. As described further below, gas is initially supplied to the constant pressure container 106 prior to sample extraction in order to properly back-pressure the constant pressure container 106 which will keep any samples added therein in a liquid state at ambient temperature. Further, during the process of filling the constant pressure container 106 with liquid samples, if the pressure within the constant pressure container 106 becomes greater than a pressure setting of a pressure relief valve 192, the gas will be bleed off through the container line 149 back to the enclosure 160 via input/output port 190. The excess gas is then pushed from the enclosure 160 via vent port 194 and corresponding interconnected feed lines. To ensure that this excess gas is not pushed back toward supply port 181, the enclosure 160 includes a check valve 175 positioned on the supply line to the constant pressure container 106 upstream of the supply port 181. Further, an optional isolation valve 173 may be positioned downstream of input/output port 190 to keep the line closed until the user is ready to pre-charge the constant pressure container 106 as described further herein.

Although various methods exist for operating the system 100 to extract cryogenic liquid from an external source to a constant pressure container 106 while maintaining the sample in its liquid state, an exemplary method will now be described to illustrate operation of the system 100. As illustrated in FIG. 1, the chamber 110 can be installed at or proximate a pipeline 102 to extract cryogenic liquid therefrom via extractor 104. Optional speed loop line 144 can then be connected to form a speed loop and optional vacuum line 143 can be connected if the chamber 110 needs to be further insulated for extraction. Sample line 146 can then be connected between valve 147 and chamber 110 and pump line 142 can be connected between the enclosure 160 and chamber 110. Further, the constant pressure container 106 can be connected to valve 147 and container line 149 to connect the constant pressure container 106 to both the enclosure 160 and chamber 110. It should be noted that these steps can be completed in any order and that in one example the valve 147 is optional such that the constant pressure container 106 could be connected directly to sample line 146.

Once the system 100 connections are made between the enclosure 160, the chamber 110 and the constant pressure container 106, the connected constant pressure container 106 is back-pressured to a predetermined pressure (i.e. 250 psi) by a supply of gas, such as nitrogen, from supply port 181 via interconnected feedlines and container line 149. Initial back-pressuring of the constant pressure 106 container ensures that any sample pulled from the external source 102 will remain in its liquid state at ambient temperature. Next, a pressure regulation level for the vacuum device 180 (i.e. ejector) is set to a predetermined pressure level (i.e. 90 psi) via pressure regulator 177 to induce the creation of a vacuum in the chamber 110 via vacuum line 143. Once this is completed, the valve 105 is opened to allow a sample to be pulled from the external source 102 via the extractor 104. Once the valve 105 is opened, the valve 145 on the speed loop line 144 is opened and adjusted to a predetermined setting which allows for adequate speed loop flow. To ensure the sample line 146 is empty, the valve 147 can then be adjusted so that any flow of cryogenic liquid from sample line 146 proceeds to purge line 148 and back to the external source 102. Once valve 147 is set in this manner, the pump purge valve 114 is opened for a period of time that will allow the sample line 146 to be adequately purged and the incoming sample stream through the speed loop 144 to be in a liquid state. In some examples, this is determined by an amount of ice formation on the speed loop line 144 and at the speed loop port 122. Once an adequate liquid sample is detected, the pump purge valve 114 is closed and valve 147 is adjusted so that flow through the sample line 146 will proceed to the constant pressure container 106. At this point, the PLC 162 is activated to operate the pump 112 as described previously herein to control the extracting of cryogenic liquid from the external source 102. Extraction is then performed for a predetermined sampling period (see Tables 1 and 2 below) at which point the system 100 operation can be manually or automatically terminated. The constant pressure container 106 can then be collected and transported for later analysis while maintaining the sample therein in liquid form. In one example, the sample contained in the composite sampler container 106 can be partitioned to separate smaller constant pressure containers for testing and/or storage in accordance with standard custody agreements.

Timing, extraction size and other parameters can be programmed into the PLC 162 for a variety of applications. Exemplary parameters for two different constant pressure containers 106 (i.e. Table 1 for Container 1 and Table 2 for Container 2) can be as follows:

TABLE 1

| | |
|---|---|
| Time Start | 9:30 am |
| Time Stop | 9:50 am |
| Cylinder Size | 500 cc |
| Pump Bite Size | 1.8 cc |
| Pump Stroke Time | 4 seconds |
| % Fill | 80% |

TABLE 2

| Time Start | 10:30 am |
| --- | --- |
| Time Stop | 11:40 PM |
| Cylinder Size | 1000 cc (Raymond to confirm) |
| Pump Bite Size | 0.8 cc |
| Pump Stroke Time | 4 seconds |
| % Fill | 80% |

It should be understood for a person having ordinary skill in the art that a device or method incorporating any of the additional or alternative details mentioned above would fall within the scope of the present invention as determined based upon the claims below and any equivalents thereof. Other aspects, objects and advantages of the present invention should be apparent to a person having ordinary skill in the art given the drawings and the disclosure.

What is claimed is:

1. A composite cryogenic liquid sampling system comprising:
   a chamber having affixed therein a sample pump configured to pull a cryogenic liquid sample from an external source;
   a separate enclosure having
      a supply port configured to receive an input stream of a gas,
      an input port connected to the chamber via a vacuum line,
      a sample pump port connected to the chamber via a pump line and configured to feed therethrough the gas received at the supply port to the sample pump to control stroke timing thereof,
      a vacuum device connected to the input port and configured to generate a vacuum within the chamber by pulling air from the vacuum line,
      processing circuitry, and
      an external composite liquid sample collection container connected by a sample input line to the sample pump in the chamber, and
      an input/output port configured to feed gas received from the supply port to the external composite liquid sample collection container with a container line,
   where the processing circuitry is configured to control the vacuum device and the sample pump to perform transfer of the cryogenic liquid sample from the external source to the external liquid sample collection container and for maintaining constant pressure within the composite liquid sample collection container to prevent phase change of the liquid sample during sampling by bleeding off excess pressure through the container line.

2. The composite cryogenic liquid sampling system of claim 1, wherein the gas is nitrogen.

3. The composite cryogenic liquid sampling system of claim 1, wherein the vacuum device is an ejector.

4. The composite cryogenic liquid sampling system of claim 1, wherein the external source is a pipeline.

5. The composite cryogenic liquid sampling system of claim 1, wherein the input/output port is configured to receive and vent gas from the external composite liquid sample collection container purged by an incoming cryogenic liquid sample pulled by the sample pump.

6. The composite cryogenic liquid sampling system of claim 1, wherein the vacuum device receives the gas from the supply port to generate the vacuum within the chamber via the vacuum line.

7. The composite cryogenic liquid sampling system of claim 1, wherein the chamber includes a speed loop port connected to a speed loop configured to direct a portion of the cryogenic liquid sample back to the external source.

8. A composite cryogenic liquid sampling device comprising:
   a chamber having affixed therein a sample pump configured to pull a cryogenic liquid sample from an external source; and
   a separate enclosure having
      a supply port configured to receive an input stream of a gas,
      an input port for the gas,
      a sample pump port configured to feed the gas received at the supply port to the sample pump to control stroke timing thereof,
      an input/output port configured to feed gas received from the supply port to an external composite liquid sample collection container with a container line external to the separate enclosure and the external composite liquid sample collection container connected by a sample input line to the sample pump in the chamber,
      a vacuum device connected to the input port and configured to generate a vacuum within the chamber by pulling air from the chamber, and
      processing circuitry configured to control the vacuum device and the sample pump to perform transfer of the cryogenic liquid sample from the external source to the external composite liquid sample collection container and for maintaining constant pressure within the sample collection container to prevent phase change of the liquid sample during sampling by bleeding off excess pressure through the container line.

9. The composite cryogenic liquid sampling device of claim 8, wherein the gas is nitrogen.

10. The composite cryogenic liquid sampling device of claim 8, wherein the vacuum device is an ejector.

11. The composite cryogenic liquid sampling device of claim 8, wherein the external source is a pipeline.

12. The composite cryogenic liquid sampling device of claim 8, wherein the input/output port is further configured to receive and vent gas from the external composite liquid sample collection container purged by an incoming cryogenic liquid sample pulled by the sample pump.

13. The composite cryogenic liquid sampling device of claim 8, wherein the vacuum device is configured to receive the gas from the supply port to generate the vacuum within the chamber.

14. The composite cryogenic liquid sampling device of claim 8, wherein the chamber includes a speed loop port configured to connect to a speed loop to direct a portion of the cryogenic liquid sample back to the external source.

15. The composite cryogenic liquid sampling device of claim 14, wherein the sample pump includes a purge valve configured to purge the sample line.

* * * * *